Patented Apr. 20, 1954

2,676,178

UNITED STATES PATENT OFFICE 2,676,178

PYRIDINE COMPOUNDS AND METHOD OF MANUFACTURE

Herman Herbert Fox, Passaic, N. J., assignor to Hoffmann-La Roche Inc., Nutley, N. J., a corporation of New Jersey No Drawing. Application September 9, 1950, Serial No. 184,117

6 Claims. (Cl. 260—294.8)

The present invention relates to isonicotinaldehyde thiosemicarbazone, the acid addition salts thereof, and the method for preparing the same. The novel compounds are useful in the field of therapeutics, and more particularly in the field of tuberculosis.

Isonicotinaldehyde thiosemicarbazone can be represented by the formula

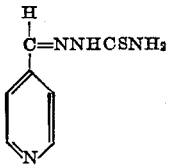

Isonicotinaldehyde thiosemicarbazone can be readily prepared in good yields and a high state of purity by reacting isonicotinic benzenesulfonhydrazine with thiosemicarbazide in the presence of an alkaline compound, such as, an alkali metal carbonate, e. g., sodium carbonate or potassium carbonate, at an elevated temperature, preferably at about 120–160° C. The reaction is carried out in any suitable water-miscible organic solvent, for example, a polyhydroxy alcohol, such as glycerine or ethylene glycol. The isonicotinaldehyde thiosemicarbazone is insoluble in cold water, and separates from the reaction mixture directly upon addition of water followed by cooling of the solution. The product thus obtained is in a very high state of purity so that no further recrystallization is usually necessary. Isonicotinaldehyde thiosemicarbazone readily forms addition salts on treatment with acids, for example, hydrochloric acid, hydrobromic acid, sulfuric acid, phosphoric acid, oxalic acid, tartaric acid, and the like.

The following examples will serve to illustrate the invention.

Example 1

A mixture of 25 grams of isonicotinic benzenesulfonhydrazide, 24 grams of anhydrous sodium carbonate, 9 grams of thiosemicarbazide and 100 cc. of glycerine was heated rapidly to 160° C. and maintained at this temperature for about two minutes. During heating the reaction mixture began to foam markedly at 120° C. and substantially ceased foaming after having been maintained for two minutes at 160° C. 100 cc. of water were then added to the reaction mixture. Upon standing and cooling, isonicotinaldehyde thiosemicarbazone crystallized and was filtered off. It melted with decomposition at 219° C. The melting point did not change upon reprecipitation of the compound from hot dilute hydrochloric acid with dilute ammonium hydroxide.

The hydrochloride of isonicotinaldehyde thiosemicarbazone was prepared by dissolving the base in hot dilute hydrochloric acid. On cooling the solution, deep yellow crystals of the monohydrochloride were obtained, M. P. 269° C. (with decomposition).

The sulfate was prepared in a similar manner with dilute sulfuric acid, and melted at 231° C. (with decomposition).

Example 2

25 grams of isonicotinic benzenesulfonhydrazide and 9 grams of thiosemicarbazide were dissolved in 80 cc. of hot ethylene glycol. The resulting solution was cooled to 100° C. and 15 grams of anhydrous sodium carbonate were added. The mixture was then heated gradually to 120° C. and maintained at this temperature until foaming almost ceased. The temperature was then raised slowly to and maintained at 140° C. until foaming ceased. To the mixture were then added 240 cc. of water. The solution was immediately filtered and the filtrate then cooled whereupon pure isonicotinaldehyde thiosemicarbazone crystallized out and was filtered off. The compound melted at 219° C. (with decomposition).

I claim:

1. A process for preparing isonicotinaldehyde thiosemicarbazone having the formula

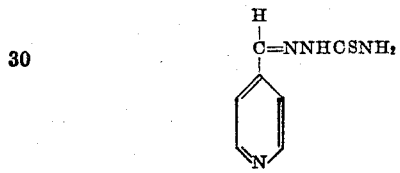

which comprises reacting isonicotinic benzenesulfonhydrazide and thiosemicarbazide in the presence of an alkali metal carbonate.

2. A process as in claim 1, wherein the alkali metal carbonate is anhydrous sodium carbonate.

3. A process as in claim 1, wherein the reaction is carried out in a water-miscible polyhydroxy alcohol solvent.

4. A process as in claim 3, wherein the solvent is glycerine.

5. A process as in claim 3, wherein the solvent is ethylene glycol.

6. A process as in claim 3, wherein the reaction is carried out at a temperature of about 120–160° C.

References Cited in the file of this patent

Hoggarth, British J. of Pharmacology (1949) (4) pp. 248–53.

Sah, Rec. Trav. Chim., vol. 69 (1950) pp. 1545–56.

Sidgwick, "Organic Chemistry of Nitrogen," Oxford Press (1942), page 549.